United States Patent [19]

Mohl et al.

[11] 4,387,608
[45] Jun. 14, 1983

[54] ELECTRONIC CONTROL FOR A STEPLESS VEHICLE TRANSMISSION USING A CONTROL MEMBER RESPONSE TO DYNAMIC PRESSURE

[75] Inventors: Helmut Mohl, Schwieberdingen; Manfred Schab, Gerlingen; Joseph Sauer, Schwieberdingen; Alfred Müller, Leonberg, all of Fed. Rep. of Germany

[73] Assignee: Robert Bosch GmbH, Stuttgart, Fed. Rep. of Germany

[21] Appl. No.: 184,388

[22] Filed: Sep. 5, 1980

[30] Foreign Application Priority Data

Sep. 12, 1979 [DE] Fed. Rep. of Germany ....... 2936784
Jan. 9, 1980 [DE] Fed. Rep. of Germany ....... 3000544

[51] Int. Cl.³ .................... B60K 41/14; F16H 55/56
[52] U.S. Cl. ................................. 74/866; 74/867; 474/12; 474/18
[58] Field of Search ............... 474/12, 18; 74/865, 74/866, 867

[56] References Cited

U.S. PATENT DOCUMENTS 4,107,776 8/1978 Beale ........................ 74/866 X
4,161,894 7/1979 Giacosa ..................... 474/12 X Primary Examiner—Allan D. Herrmann
Attorney, Agent, or Firm—Frishauf, Holtz, Goodman & Woodward

[57] ABSTRACT

To control transmission ratio of a continuously variable transmission connected to a combustion engine (e.g., for optimal fuel efficiency of a powered vehicle), effective diameter of pulleys is controlled in response to an electrical signal. A control signal suitable for comparison with hydrodynamic pressure values is produced by a computing device based on input signals representing load, speed, and other operating conditions and based further on stored data representing engine characteristics. A control signal is conveniently used to control hydrodynamic pressure by means of electromagnetically operated valves. Such control device is readily adapted to different engines by replacement of stored characteristic data.

4 Claims, 3 Drawing Figures

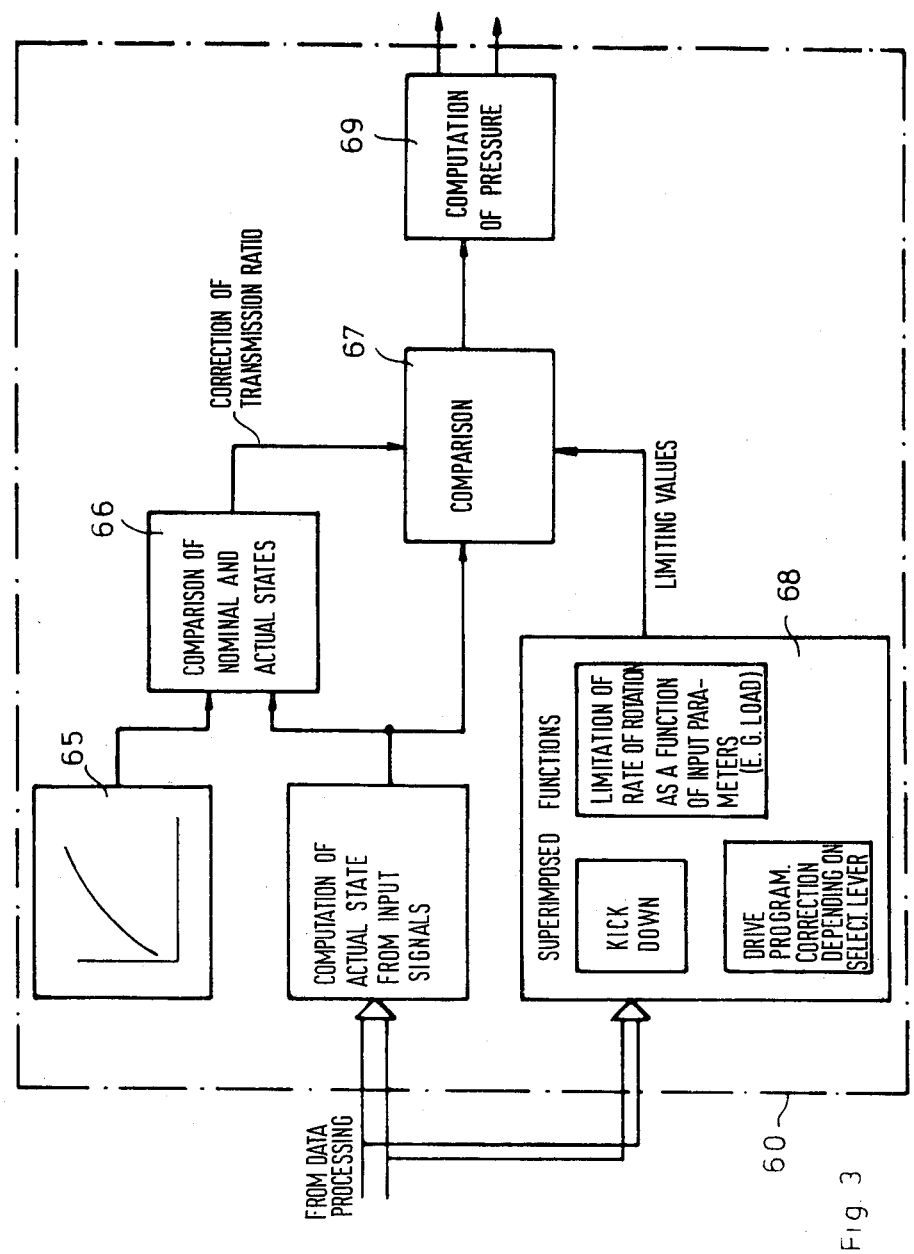

ent system. An electrical
ELECTRONIC CONTROL FOR A STEPLESS VEHICLE TRANSMISSION USING A CONTROL MEMBER RESPONSE TO DYNAMIC PRESSURE

CROSS-REFERENCE TO RELATED APPLICATIONS

U.S. application Ser. No. 172,239, filed July 25, 1980, entitled "Apparatus for Decreasing Jolts During Gear Shifts in Automatic Transmissions in Motor Vehicles", by H. Mohl et al., and U.S. application Ser. No. 186,319, filed Sept. 11, 1980, entitled "Electronic Control of Stepless Vehicle Transmission Using a Control Member Response to Static Pressure", (claiming priority based on German application No. P 30 00 581.3. These applications are hereby incorporated by reference in the present application.

The invention is concerned with stepless (continuously variable, infinitely variable) transmissions and, more particularly, with the control of transmission ratio in such transmissions.

BACKGROUND AND PRIOR ART

To adjust effective diameter of pulleys in hydraulically and/or pneumatically controlled V-belt drives in continuously variable transmissions, known control devices rely on mechanical linkage to transmit a change in the position of the accelerator pedal so as to turn a cam plate which acts on a control element. Such continuously variable transmissions are used, e.g., in the interest of fuel efficient operation of a combustion engine. To this effect, control of the transmission aims at adjustment of transmission ratio so as to allow the engine of a vehicle to operate at optimal rotational rate and to produce optimal torque (optimal with respect to fuel efficiency) under all load conditions. Known control devices tend to be difficult to adjust to different types of combustion engines having different characteristics of optimal torque; moreover, mechanical transmission of the position of the accelerator pedal may be subject to linkage errors.

THE INVENTION

It is an object of the invention to provide for direct, accurate control of a continuously variable transmission based on combustion engine characteristics and load conditions.

In accordance with the invention, a control parameter is produced in the form of an electrical signal by an electronic control system, taking into account load conditions and engine speed. The electrical signal may electromechanically influence a control element or, alternatively, may be transformed into a hydrostatic signal which hydraulically or pneumatically influences a control element (the terms "hydrostatic" and "hydrodynamic" used herein are to be understood to be applicable to pneumatic as well as to hydraulic controls). One and the same control system may serve for the control of different types of engines as may be used, e.g., in moving vehicles such as, e.g., cars, trucks and buses; to this end, a small computing device such as, e.g., a microprocessor may be conveniently incorporated in the control system. Use of different memory modules in such computing device allows for convenient adaptation to different engine characteristics and, possibly, to other data as stored in such memory module.

Specific embodiments of the invention provide for simple adaptation of a transmission (such as, e.g., the well-known Transmatic transmission made by the Transmissie company) to an engine, without need for a mechanical sensor in the control signal may electromechanically influence a control element; it is often simpler however, to transform the electrical signal into a pressure signal, preferably a hydraulic pressure signal. In this case, one or several pressure control devices are provided so as to provide for continuously variable pressure of a fluid on a control element. Control may be by digital output signals from a control device, digital signals being transformed into pressure pulses by electrically pulsed electromagnetic valves. (Pulse frequency is preferably chosen sufficiently high such as, e.g., at approximately 80 Hz, to result in control of transmission ratio by the mean valve of pressure variations). To dampen pressure variations caused by pulsed control, it may be desirable to connect a pressure vessel to the fluid system at a suitable location; however, due to the relatively large volume of the fluid in cylinders serving to adjust V-belt pulleys, sufficient damping may occur even in the absence of a separate pressure vessel.

Since described pressure control elements are effective in regulating pressure at their outlet ports to a value which is determined by an electrical input signal, additional sensors can be dispensed with. If, however, electrically pulsed control valves are used for pressure control, a pressure sensor may usually be required. Pressure in a V-belt pulley may conveniently be taken into account by such sensor.

The invention is more generally applicable to continuously variable transmissions and, in particular, to transmissions involving control of effective diameter of discs and wheels. Included are, e.g., continuously variable link belt drives.

THE DRAWING

FIG. 3 shows a detail feature of the control device according to FIG. 2.

Figure 1:
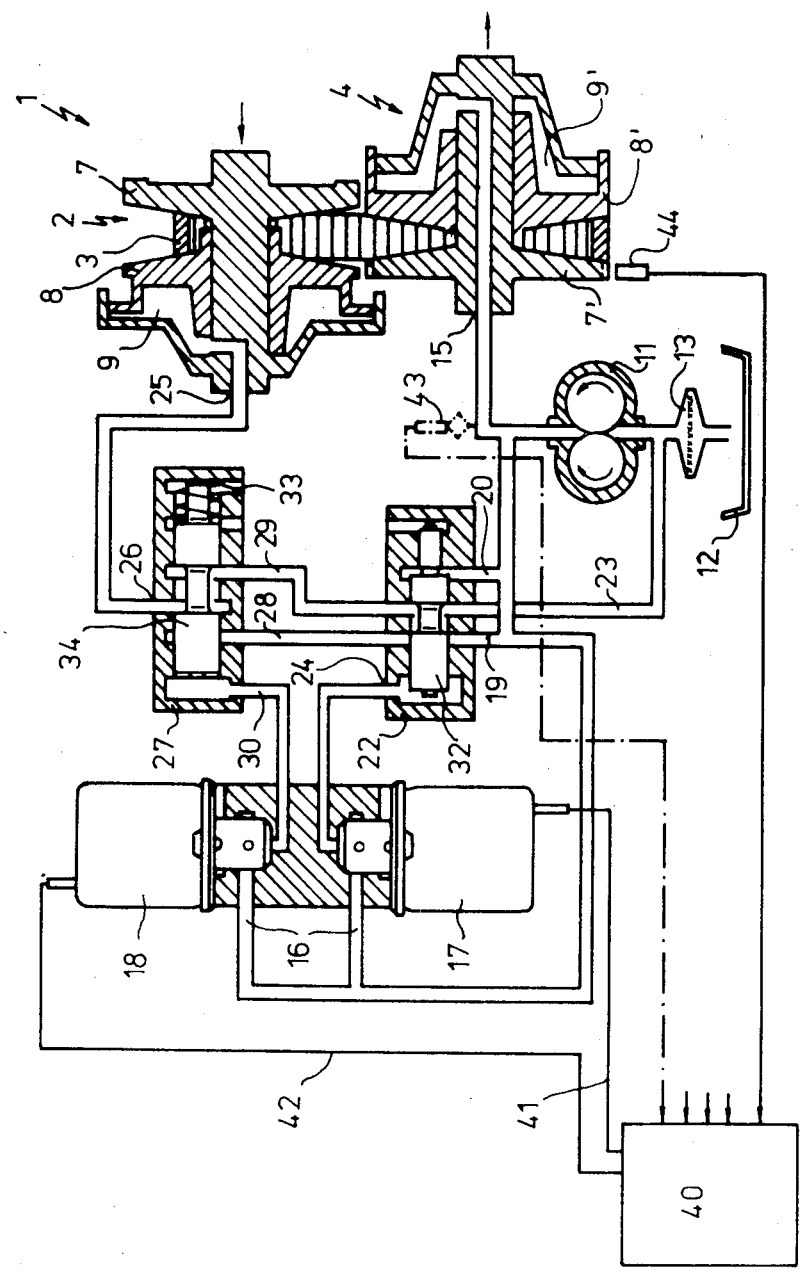
FIG. 1 is a simplified representation of a hydraulically controlled V-belt drive with a first embodiment of a control system, features of a second embodiment being indicated by chain-dotted lines.

Shown in FIG. 1 is a V-belt drive 1 in which a first pulley 2 is driven by the combustion engine of a motor vehicle. By means of V-belt 3, the first pulley 2 drives a second pulley 4 which is connected to the drive wheels of the vehicle. Aside from differences in technical detail, pulleys 2 and 4 have components 7 and 8 (7' and 8', respectively) which are axially movable relative to each other, but which rotate as a whole. Upon introduction of a fluid into space 9 or 9', respectively, movable part 8 or 8', respectively, is shifted relative to stationary part 7 or 7', respectively. As a result of such shifting, the annular gap narrows in which V-belt 3 is located between parts 7 and 8 or 7' and 8', respectively. This, in turn, results in shifting of V-belt 3 toward the perimeter of the respective pulley 2 or 4, and the effective diameter of such pulley is enlarged. If pressure is reduced in space 9 or 9', parts 7 and 8 or 7' and 8', respectively, are pressed apart by belt 3, provided belt 3 is under sufficient tension. A hydraulic fluid is supplied by pump 11 from reservoir 12 via filter 13; such fluid passes from the delivery side of pump 11 directly to hydraulic connection 15 of pulley 4 on the one hand and, on the other, to inlet ports 16 of electromagnetic pressure control devices 17 and 18 and to inlet ports 19 and 20 of a pressure control valve 22. A drain port 23 of valve 22 is connected to the intake side of pump 11. A hydraulic control input port 24 is connected to the output port of pressure control device 17. The hydraulic connection 25 of pulley 2 is connected to an output port 26 of a valve 27 for controlling transmission ratio, inlet port 28 of valve 27 is connected to inlet port 19 of valve 22, and drain port 29 of valve 27 is connected to drain port 23 of valve 22. A hydraulic control input port 30 is connected to the output port of pressure control device 18. Not shown in FIG. 1 are additional drain ports which are present in pressure control devices 17 and 18 and which lead to reservoir 12. Hydraulic pressure at connection 20 of valve 22 is transmitted to a surface of a piston of control slide 32, acting on slide 32 in a leftward direction in FIG. 1, whereby a connection is established between ports 19 and 23. Hydraulic pressure applied at control port 24 acts on slide 32 in an opposite direction. Valve 27 for controlling transmission ratio is provided with a spring 33 which acts to move slide 34 to its left position in which a connection is established between inlet 28 (connected to the delivery side of pump 11) and hydraulic port 25 of pulley 2. Hydraulic pressure at port 30 acts to move slide 34 to its right position in which hydraulic port 25 is connected to the intake side of pump 11.

Separate output leads 41 and 42 of an electronic control unit 40 are connected to electrical control inputs of pressure control devices 17 and 18. The control unit 40 receives from tachometer 44 a signal representing rate of rotation of pulley 4 and, as further indicated by short arrows in FIG. 1, with input signals corresponding to position of a selector lever (not shown in FIG. 1), to transmission function, to load conditions (as may be suitably derived from the position of the throttle valve or from the strength of the vacuum in the carburetor air intake), and, finally, to the rate of rotation of the engine. These input signals are used by control unit 40, in combination with an engine characteristic such as, e.g., maximum fuel efficiency as a function of operating conditions, to select a transmission ratio for V-belt drive 1. Corresponding signals are sent to pressure control devices 17 and 18. Any deviation of actual transmission ratio from nominal transmission ratio may be monitored by comparing rates of rotation. The signal fed to pressure control device 17 depends on transmission ratio and rate of rotation of the engine; the signal fed to pressure control device 18 depends on load and rate of rotation of the engine.

If analog, continuously operating pressure control devices 17 and 18 are replaced by digitally operating electromagnetic valves, positive pressure control requires a pressure sensor 43 which is responsive to pressure in pulley 4. This arrangement is shown by chain-dotted lines in FIG. 1. In this alternate embodiment, control unit 40 is designed to produce pulsed signals for activating electromagnetic valves. Accordingly, electromagnetic valves corresponding to devices 17,18 are designed as 3/2 valves, i.e., each valve has three ports and two switching positions. In one switching position the hydraulic input port 16 of a valve is connected to the output port 24,30 shown in FIG. 1, and in the other position the input port 16 of the valve is connected to a drain (not shown in FIG. 1) which leads to the sump 12, while the output port (shown in FIG. 1) is blocked.

Figure 2:
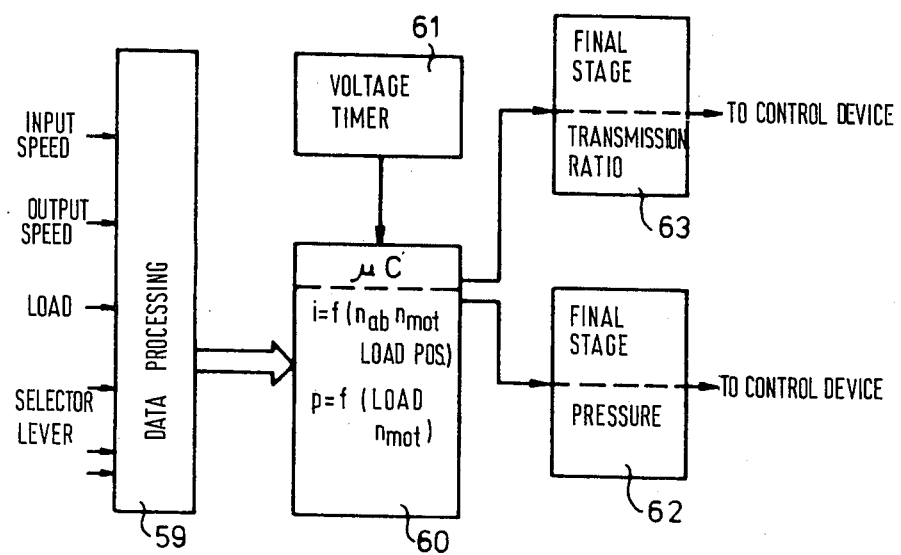
FIG. 2 is a circuit block diagram of the control device used in the embodiment according to FIG. 1.

Components of control unit 40 of the embodiment, according to FIG. 1, for acting on the pressure control devices, are shown in FIG. 2. Data processing device 59 receives signals corresponding to the rotational rate of pulley 4, to the rotational rate of the engine, to load conditions, and to the position of a selector lever of the transmission (e.g., positions for reverse, idle, low, and high) and transforms these signals into a form suitable for further processing. The signals are fed to microprocessor 60 which is connected to a voltage source and timing device 61. Output signals of microprocessor 60 are fed to final stages 62 and 63, where they are amplified and sent to pressure control devices 17 and 18 for producing a control pressure for commensurate control of valves 22 and 27, respectively. Microprocessor 60 serves as a computer for determining transmission ratio. As illustrated in FIG. 3, such determination involves ascertaining actual operating conditions of the engine and the transmission and, based on fuel consumption data stored in memory 65, producing an optimal transmission ratio. Actual and optimal transmission ratios are compared by comparator 66 whose output signal is fed to an additional comparator 67. Comparator 67 receives additional signals through a second input for critical limiting values; these limiting values are determined by unit 68 which produces maximum and minimum rotational rates as a function of input parameters, and which limits transmission ratio depending on position of the selector lever and of the kickdown switch. The output signal of comparator 67 corresponds to the nominal value of the transmission ratio, and it is this value which is used by a computing device 69 to determine the signals for controlling pressure control devices 17 and 18.

Pump 11 is operational continuously so as to maintain required pressure in the various components of the described arrangement.

We claim:
1. Control apparatus for a continuously variable motor-vehicle transmission of the V-belt type having first and second pulleys of variable effective diameter and a belt for transmitting power between them, each of said pulleys having its effective diameter variable by a disk element thereof displaceable by a pressure medium, a first pressure control valve (27) responsive to a control signal of a system providing regulation in terms of gear ratio, for controlling the pressure for displacing said disk element (2) of said first pulley, a second pressure control valve (22) responsive to a control signal representative of engine load of said motor vehicle for controlling the pressure for displacement of said disk element (4) of said second pulley, means for supplying the output oil supply pressure of an oil pump (11) to said first and second pressure control valves, and further comprising:

electromagnetic pressure controllers (18,17) for generating said control signals for application to said first and second pressure control valves in the form of hydraulic pressures, said electromagnetic pressure controllers being connected to the output of said oil pump (11) and being controlled respectively by an electronic control circuit (40) for setting the gear ratio of said transmission by means of said first pressure control means (27) and by the pressure of said disk element (2,4) against said V-belt and thereby the efficiency of the transmission (1) by means of said second pressure control valve (22), in such a way as to reduce to a minimum the fuel consumption of said engine.

2. Control apparatus according to claim 1, in which said electromagnetic pressure controllers (18,17) are constituted for providing hydraulic pressure signals at their outputs in a continuous manner.

3. Control apparatus according to claim 1, in which said electromagnetic pressure controllers (18,17) are constituted so as to provide hydraulic pressure signals at their outputs which are of pulsed character, and in which a pressure transducer (43) is provided at the output of said pump (11) for supplying an electrical signal representative of the pressure at said output to said electronic control circuit (40).

4. Control apparatus according to claim 1, in which said disk elements (2,4) have operating surfaces for response to said pressure medium, the respective operating surfaces of said disk elements of said first and second pulleys being of different sizes, there being further provided in said control circuit (40), means for causing the signals produced by said electromagnetic controllers (18,17) to be representative additionally of engine speed.

* * * * *